UNITED STATES PATENT OFFICE.

WILFRID P. HEATH, OF SPOKANE, WASHINGTON, ASSIGNOR TO AMERICAN CONSERVATION SERVICE CORPORATION, OF SPOKANE, WASHINGTON, A CORPORATION.

PROCESS OF TITRATION.

1,358,950.  Specification of Letters Patent.  Patented Nov. 16, 1920.

No Drawing.  Application filed February 16, 1918. Serial No. 217,632.

*To all whom it may concern:*

Be it known that I, WILFRID P. HEATH, a citizen of the United States of America, residing at Spokane, in the county of Spokane and State of Washington, have invented new and useful Improvements in Processes of Titration, of which the following is a specification.

The object of this invention is to provide a process of determining the amount of titrating solution used by weighing it instead of measuring it as is usually done.

The titration is performed on one scale pan and the amount of titer added indicated by weighing. For example, in making the lactic acid test in cream process where forty five grams of cream are put in a previously balanced cup, several drops of indicator (phenolphthalein) has been introduced. Into this forty-five grams of cream containing the indicator is next admitted from a siphon tenth normal hydroxid of sodium until a permanent faint pink color shows up which does not disappear with further stirring. The cup containing the sample of milk product (ice cream mix, milk, butter milk, starter, cream, condensed milk, etc.) together with the chemical required (neutralizer) is replaced upon the scale, whereupon the amount of chemical necessary to neutralize the acid is weighed directly and the scale beam is so calibrated that this weight corresponds to direct percentage of acid in the sample.

What is claimed is:

1. The process of titration by weight, which comprises the placing of a weight upon one plate of a balance scale and the placing of a chemical compound in solution upon the other plate, and then weighing it, then introducing into said solution another chemical compound of known strength in solution to re-act chemically with it and then weighing the mixture.

2. The process of titration by weight comprising the performing of titration on one scale pan and indicating the amount of titer added by weighing.

In testimony whereof I affix my signature in presence of two witnesses.

WILFRID P. HEATH.

Witnesses:
J. E. McANDREW,
L. L. WESTFALL.